(12) United States Patent
Jacklin

(10) Patent No.: US 6,396,472 B1
(45) Date of Patent: May 28, 2002

(54) DEVICE AND PROCESS FOR DISPLAYING IMAGES AND SOUNDS

(76) Inventor: Peter L. Jacklin, 1436 N. Stallion St., Orange, CA (US) 92869-1378

( * ) Notice: Subject to any disclaimer, the term of this patent is extended or adjusted under 35 U.S.C. 154(b) by 0 days.

(21) Appl. No.: 08/739,149

(22) Filed: Oct. 28, 1996

(51) Int. Cl.$^7$ .............................. G09G 3/36; H05K 7/00
(52) U.S. Cl. ..................... 345/104; 345/901; 348/231; 361/681
(58) Field of Search ................. 345/204, 901, 345/104, 146; 704/272; 360/2, 5; 369/14; 358/527; 386/69, 55; 361/679–682; 348/231

(56) References Cited

U.S. PATENT DOCUMENTS

| | | | | |
|---|---|---|---|---|
| 4,312,581 A | * | 1/1982 | Miyagawa et al. | 396/283 |
| 4,423,938 A | * | 1/1984 | Tominaga | 396/318 |
| 4,717,971 A | * | 1/1988 | Sawyer | 386/55 |
| 4,754,271 A | * | 6/1988 | Edwards | 345/98 |
| 4,860,122 A | * | 8/1989 | Kanamaru | 386/69 |
| 4,888,648 A | * | 12/1989 | Takeuchi et al. | 386/52 |
| 4,937,676 A | * | 6/1990 | Finelli et al. | 348/360 |
| 5,313,235 A | * | 5/1994 | Inoue et al. | 360/2 |
| 5,329,289 A | * | 7/1994 | Sakmoto et al. | 345/659 |
| 5,335,192 A | * | 8/1994 | Oshiba | 361/681 |
| 5,359,374 A | * | 10/1994 | Schwartz | 704/272 X |
| D359,488 S | * | 6/1995 | Hui | D14/141 |
| 5,438,344 A | * | 8/1995 | Oliva | 345/901 X |
| 5,461,596 A | * | 10/1995 | Barrett | 369/14 |
| 5,466,166 A | * | 11/1995 | Law et al. | 439/159 |
| 5,484,292 A | * | 1/1996 | McTaggart | 345/901 X |
| 5,504,836 A | * | 4/1996 | Loudermilk | 704/272 |
| 5,534,888 A | * | 7/1996 | Lebby et al. | 345/901 X |
| D375,098 S | * | 10/1996 | Moallemi et al. | D14/168 |
| 5,574,519 A | * | 11/1996 | Manico et al. | 396/429 |
| 5,582,373 A | * | 12/1996 | Baudot | 248/166 |
| 5,604,512 A | * | 2/1997 | Okamoto | 345/146 |
| 5,608,608 A | * | 3/1997 | Flint et al. | 361/686 |
| 5,613,135 A | * | 3/1997 | Sakai et al. | 710/62 |
| 5,625,534 A | * | 4/1997 | Okaya et al. | 361/686 |
| 5,634,080 A | * | 5/1997 | Kikinis et al. | 395/893 |
| 5,702,169 A | * | 12/1997 | Nishimura | 353/25 |
| 5,703,624 A | * | 12/1997 | Van Kruistum | 345/901 X |
| 5,761,485 A | * | 6/1998 | Munyan | 345/350 |
| 5,769,369 A | * | 6/1998 | Meinel | 248/176.1 |

(List continued on next page.)

OTHER PUBLICATIONS

Author: Aug. 5 Miniature Memory Cards Bursky, David 1996 Journal: Electronic Design pp 46 and 48.
Toshiba—SSFDC Product—Overview.
San Disk—The Universal—Storage Solution.
Intel—Miniature Card—Overview.
Boyd–Merritt Oct. 2, 1995 Flash Cards: pp 1,16 Electronic Eng. Times.
Yoshiko Hara Jan. 29, 1996 Minicard Promoters: p 16 Electronic Eng. Times.

*Primary Examiner*—Dennis-Doon Chow
*Assistant Examiner*—Amr Awad

(57) ABSTRACT

An electronic picture frame receives a removable flash memory card, or related non-volatile digital recording medium, which exist at miniature scale, having stored images, audio and data and includes means for displaying, arraying, fixing, and generally enjoying same in the traditional modes by which photographic images have been known and cherished over time. Economic efficiency dictates the structure and network and system software are likewise compatible, providing apparatus effective for automatic cycling of digital still photographs, and for use in combination with local area networks. However, the electronic frame functions as a free standing unit and may be used without the need or complex or high technology interfacing assistance. A process for displaying digital still photographs stored on known non-volatile digital storage media is likewise taught.

3 Claims, 6 Drawing Sheets

U.S. PATENT DOCUMENTS

| | | | | |
|---|---|---|---|---|
| D396,351 S | * | 7/1998 | Patkunan | D6/300 |
| 5,790,193 A | * | 8/1998 | Ohmori | 348/233 |
| 5,796,428 A | * | 8/1998 | Matsumoto et al. | 348/231 |
| 5,801,713 A | * | 9/1998 | Endo et al. | 345/901 |
| 5,812,899 A | * | 9/1998 | McIntyre | 396/661 |
| 5,825,408 A | * | 10/1998 | Yuyama et al. | 348/14 |
| 5,829,014 A | * | 10/1998 | Hayashi | 711/103 |
| 5,841,878 A | * | 11/1998 | Arnold et al. | 381/124 |
| 5,842,672 A | * | 12/1998 | Sweere et al. | 248/278.1 |

* cited by examiner

DEVICE AND PROCESS FOR DISPLAYING IMAGES AND SOUNDS

BACKGROUND OF THE INVENTION

The present invention relates to an electronic apparatus for displaying images in combination with audio outputs. In particular, the present invention relates to an electronic apparatus useful for the displaying of digital still photographs and accompanying audio recordings utilizing a non-volatile digital recording medium, which device is functionalized as either as a free standing unit, or operationalized within an electronic local area network or related systems. Likewise, the present invention teaches a process for the displaying of digital still photographs and accompanying audio recordings utilizing non-volatile digital recording media.

Since the advent of contemporary photography, innovations related to the ability to capture images have generally lingered just ahead of those technologies designed to render such images accessible to the general viewing public. Early photographic plates required complex processing and machinery to produce prints, at extremely high cost, only for those of means or having high degrees of skill in the art. Likewise, at each stage from the creation of high resolution digital reproduction capability using removable flash memory cards, no disclosure has been developed which would allow for review and casual enjoyment of the generated images without the use of multi-component or complicated high-technology computer interface equipment. Although major corporate research and development forces from both the East and the West are attempting to standardize common specifications for flash memory cards for digital cameras (or "digital film"), and 20 million of same are forecasted to be sold in the year 2000, the equipment currently available for the average consumer's viewing of this new technology can be costly; not all consumers own equipment effective for transducing images stored on conventional "digital film", and this equipment normally is not transportable, and difficult to operate for the average consumer.

For example, while known flash memory cards can concurrently store almost one-hundred separate images—it has not been possible to access same without high-priced and complex computer interface technology, or cumbersome co-axial cable and television equipment. That is, prior to the teachings of the present invention being offered for consideration.

One simply cannot enjoy and randomly "flip- through" and enjoy the stored images in the same leisurely context as would be provided by conventional photographs and known albums for viewing same. Clearly, in order to ameliorate this unaddressed need to access the multiplicity of images, which may be so painstakingly stored digitally, in a simplified manner, the teaching of the present innovation are required.

The paucity of disclosure in this emergent field is likewise exemplified by the following U.S. Letters Patents and Publications, which are incorporated expressly herein by reference:

U.S. Pat. Nos. 5,461,596; 5,504,836; "Flash cards vie in storage derby", ELECTRONIC ENGINEERING TIMES, pages 1 and 16 (Oct. 2, 1995); "Minicard promoters release details of spec, "ELECTRONIC ENGINEERING TIMES, page 16, (Jan. 29, 1996); MINIATURE MEMORY CARDS TRIM SIZE AND WEIGHT IN PORTABLE SYSTEMS," ELECTRONIC DESIGN, pages 46–47 (Aug. 5, 1996): SANDISK FLASH DATA STORAGE: "The Universal Storage Solution " (1995); TOSHIBA SOLID STATE FLOPPY DISK CARD (SSFDC) Product Overview (1996).

U.S. Pat. No. 5,504,836 ("the '836 patent") issued on Apr. 2, 1995 to Loudermilk. The '836 patent discloses a PICTURE FRAME WITH ASSOCIATED AUDIO MESSAGE, and demonstrates that one of skill in the art is readily capable of using conventional audio message circuits to provide means for associating an audio output with a specific displayed image. However, nothing in this disclosure suggests anything but the use of a single conventional photograph, which differentiates it from the teachings of the present invention. The '836 patent likewise is demonstrative of storage of audio messages under CPU control such that initiation, or actuation, of the audio message is designed as a function of operator actions with manual switching means associated with the frame unit itself The teachings of the present invention include associating audio messages with images, but unlike the '836 patent, both audio and video storage means are controlled by the system claimed in the present invention. Further, one reasonably skilled in the art would find no hint at utilizing non-volatile digital recording media in conjunction with the '836 patent.

Likewise, U.S. Letters Pat. No. 5,461,596 ("the '596 patent") issued to Eastman Kodak on Oct. 24, 1995 is readily distinguished from the present invention, and only serves to amplify the novelty of the teachings of the instant disclosure. The '596 patent discloses a portfolio photo compact disc visual/audio display, which system was developed in response to known constraints of the photo compact disk technology, which do not impact upon the teachings of the instant invention directly. The '596 disclosure cannot be practiced without employing two photo compact disc players, and shows the type of systems which have been used to alternately address those issued ameliorated by the teachings of the present invention.

Many camera manufacturers, both domestic and abroad have begun production of digital still cameras designed around, commonly available digital recording flash media. Such known systems comprise, for example, at least one of three small form factors, such systems being exemplified by the SOLID STATE FLOPPY DISC CARD (SSFDC), the Intel MiniCard and Sandisk CompactFlash. Coming to market now, among these known cameras are those having direct slots for SSFDC's and the like non-volatile recording media, which are available for under US$1,000. Likewise, the big three Japanese camera manufacturers, (FUJI, MINOLTA, and OLYMPUS) have revealed that they plan to introduce still digital cameras into the United States. Further, EASTMAN KODAK introduced a digital recording flash medium in the third quarter of 1996, and APPLE COMPUTER will introduce one in the first quarter of 1997, which are both based upon the SSFDC model.

In essence, the SSFDC, the Intel MiniCard and Sandisk CompactFlash are vying to become a de facto standard in consumer electronics. Consumers have responded to the demand for digital cameras having capabilities of storage and editing pictures which may be done only with the use of personal computers. For digital cameras provide previously unknown flexibility to transfer images onto personal computers and to place same into documents and presentations, including adding such images to "home pages" on the internet or to send them via remote electronic mail ("e-mail").

The SSFDC, the Intel MiniCard and Sandisk CompactFlash, each serve as a storage memory or "digital film" for digital still cameras. To date, the only means for transferring images from such products as the SSFDC, the Intel MiniCard and Sandisk CompactFlash are by downloading same into personal computers for storage or manipulation, or through related uses with television sets. Unfortunately, the constraints inherent in these systems outweigh any potential benefits to consumers.

In sum, while it has become known to capture and store photographic images on non-volatile digital recording media, serious limitations exist in terms of any uses of same in a conventional sense for a user's ongoing viewing pleasure. Namely, the only known use of stored photographic images on non-volatile digital recording media exists within the context of personal computers, the like complex computer-based technologies, or cumbersome co-axial cable and television equipment. No disclosures among the prior art have addressed those problems solved by the instant teachings, which demonstrates the contributions of the present inventor to the progress of science and the useful arts.

OBJECTS AND SUMMARY OF THE INVENTION

Accordingly, it is an object of this invention to provide an electronic apparatus for the displaying of images and accompanying audio recordings stored on a removable flash memory, or similar non-volatile digital recording media, which eliminates the drawbacks of the prior art.

It is another object of the present invention to provide an electronic frame effective for receiving standard small form factor removable storage media, which media are standardly produced for use with hand held or consumer electronics products, which electronic frame is likewise effective for automatic cycling of digital still photographs, and for use in combination with local area networks.

It is still another object of the present invention to provide an electronic means of receiving any one of the at least three known forms non-volatile digital recording media, for example—SOLID STATE FLOPPY DISK CARD (SSFDC), the Intel MiniCard and Sandisk CompactFlash or the like "digital film" used for digital still cameras, which at least one of the three forms of non-volatile digital recording media are erasable, reusable, and effective for use in any number of a multiplicity of conventional digital still cameras, which electronic frame has setup and sound recording features to enable an operator to access and display desired data.

It is yet still a further object of the present invention to provide a process for displaying digital still photographs stored on known non-volatile digital storage media Briefly stated, an electronic picture fame receives a removable flash memory card, or related non-volatile digital recording medium, which exists at miniature scale, having stored images, audio and data includes means of displaying, arraying, fixing, internally enjoying same in the traditional modes by which photographic images have been known and cherished over time. Economic efficiency dictates the structure and network and system software are likewise compatible, providing apparatus effective for automatic cycling of digital still photographs, and for use in combination with local area networks. However, the electronic frame functions as a free standing unit and may be used without the need for complex or high-technology interfacing assistance. A process for displaying digital still photographs stored on known non-volatile digital storage media is likewise taught.

According to an embodiment of the present invention, an electronic apparatus for the displaying of photographs and accompanying audio recordings, comprises, in combination; means for receiving a removable non-volatile digital recording medium, means for selectively accessing and displaying at least two separate sets of data stored within said medium, means of transferring for at least two separate sets of data from a first position to a second position, and means for releasing said non-volatile digital recording medium.

According to another embodiment of the present invention, an electronic apparatus for displaying images and accompanying audio recordings stored in a non-volatile digital recording medium, comprises; said non-volatile digital recording medium being of a type of sector for storing a plurality of bits of video and audio data, means of receiving said non-volatile digital recording medium, a video chip, and audio chip, means for switching power on and off on the basis of a pre-determined electrical signal, a BIOS chip, a CPU, a ROM, a flash memory controller, a network controller, means of selectively displaying each of said plurality of bits of video and audio data, and means for ejecting said non-volatile digital recording medium.

According to still another embodiment of the present invention, electronic apparatus for displaying photographs in digital still photographs and the accompanying audio recordings stored on removable non-volatile digital recording media comprising; at least a removable flash card, said flash card further comprising stored photographs, and stored audio, at least a flash controller, at least flash cards for entry of memory into said apparatus, at least a pair of stereo speakers, a means for controlling volume, a recording microphone, and a process active matrix display stream, read only memory, stored operating software, stored network software, a video controller card, a central processing unit, a DRAM memory, a get-up means, a framing and displaying LED, at least a sound chip, at least a network chip, at least a local area network chip, means for manually selecting same, and a computer bus effective for connecting to a power source.

According to yet a still further embodiment of the present invention, there is provided a adapted for displaying a digital still photograph, said frame having top and bottom front and back sides, a transluscent screen contiguous with said frame and covering a displayed digital still photograph and through which a displayed picture is visible, means for receiving a removable non-volatile digital recording medium, means for selectively accessing images and sound data arrayed within said means for advancing accessed images and sound data from at least first position to at least a second position, means for ejecting a removable non-volatile digital recording medium.

According to an alternate preferred embodiment of the present invention there is provided a process for displaying digital still photographs stored on a non-volatile digital storage medium comprising the steps of; powering up an electronic frame system having a display screen, inserting a non-volatile digital storage medium into said electronic frame system, accessing a first desired digital still photograph, within said non-volatile digital storage medium, viewing a first desired digital still photograph, exchanging a first desired digital still photograph for a second desired digital still photograph; and, repeating said viewing step and exchanging step, wherein said accessing step further comprises accessing an accompanying desired audio sequence.

The above, and other objects, features and objectives of the present invention, shall become apparent with the following description whether in conjunction with the company drawings, in which like reference numerical designating indicators designate the same elements.

DETAILED DESCRIPTION OF PREFERRED EMBODIMENTS

The present inventor has discovered that non-volatile digital recording flash media are susceptible of novel uses within devices that have not been contemplated by or developed within the context of any known disclosures among the prior art. Namely, it has been discovered that one can display images, such as photographs stored on—for example—well known 'flash memory cards'—in conjunction with accompanying audio recording if desired, without the need for complex computer interfacing equipment—or the like hardware. Likewise, according to the teachings of present invention, it is contemplated to use any known conventional flash memory cards appurtenant to, or in conjunction with local area networks to achieve the objects of the present invention. The present invention is described in detail hereunder, referring to an embodiment thereof shown in FIGS. 1 to 6, and summarized schematically, in accordance with alternate preferred embodiments in FIG. 7.

Figure 1:
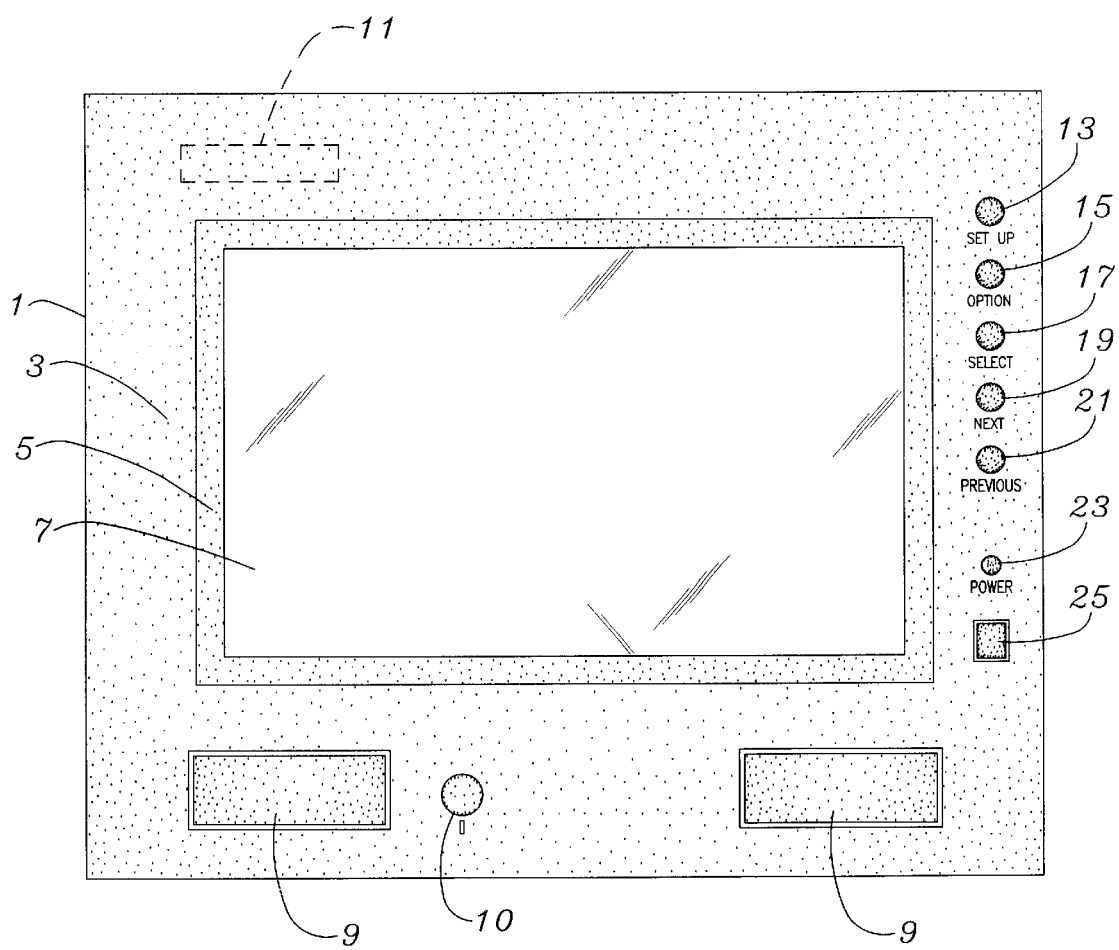
FIG. 1 illustrates a front view of a display screen of an apparatus according to an embodiment of the present invention shown in landscape orientation.
Figure 7:
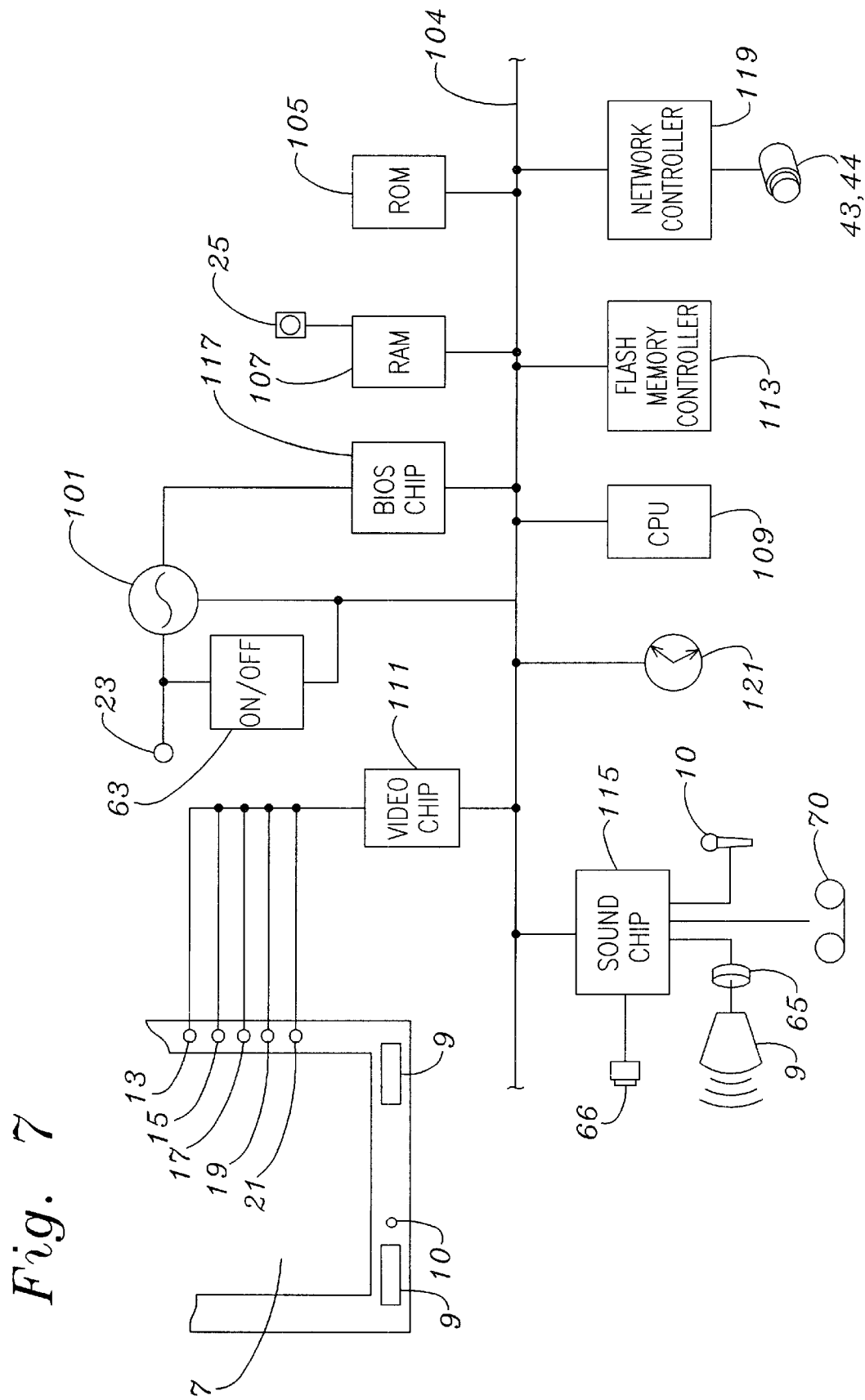
FIG. 7 schematically illustrates operations of an embodiment of the present invention, encompassing both a preferred embodiment as illustrated above in FIG. 1 to FIG. 6, and a plurality of related embodiments contemplated by the scope of the present invention as defined herein.

Referring now to FIG. 1 & FIG. 7, a preferred embodiment of the present invention may consist of a plastic molded container 3, shown here in a front view, wherein a multiplicity of electronic components are housed internally. According to this preferred embodiment, a plurality of indicators, operator control mechanisms and connectors may be mounted upon the outside of plastic molded container 3. Likewise, operator control mechanisms and connectors may be mounted upon the outside of the back portion of plastic molded container 27 (not shown in this view).

Prototypes of the present invention use any number of conventional plastics for this unit, and accordingly their composition is not further specified, because it would be readily understood by one having a modicum of skill in the art.

Plastic molded container 3, according to this illustrated preferred embodiment, includes recessed beveled frame 5, which recessed beveled frame 5 is effective for surrounding a digital still photographic image. Further, the nature of the shaping configuration of recessed beveled frame 5 serves to focus a user's attention, and concentrate a user's eyes' optical focal point upon a central portion of a displayed image within recessed beveled frame 5. Display screen 7 allows a user to view any selected digital still photograph, in addition to displaying the available operator selection options (or "setup menu"), when same has been selected by a user. Likewise, display screen 7 may contain a manufacturer specific digital still photograph, or an advertising message during the power sequence which is fully developed below, and summarized in FIG. 7.

Operationally, display screen 7 comes into play following the power on sequence when a subject digital still photograph, located at the first stored frame ("frame 1") on the digital film—or non-volatile storage medium, is displayed.

Stereophonic speakers 9, produce accompanying audio information for a selected and displayed digital still photograph, when same has been made available and stored. Microphone 10, provides audio recording to accompany digital photographs from an alternate source. Microphone 10 is not operational during power on sequence, becoming operational following power on sequence.

Stereophonic speakers 9, are silent during power up sequence, and then play associated audio recordings for frame 1, following completion of power on sequence.

Nameplate 11, provides a location for a manufacturer to display at least one of a company name, product name, logo, service mark, and/or all of the above, including related or similar indicia of a source of origin or other strings of characters appropriate to the particular application used for the involved embodiment of the apparatus according to the present invention.

Setup button 13, clears currently displayed image from the screen, and displays the fist setup screen. Setup button is not operational during the power up sequence, however, it becomes operational after the power up sequence is complete as explained further in reference to FIG. 7.

Option button 15, operates only when the setup sequence is in progress, and allows an operator to move to setup options displayed on the screen, selecting the one which is desired to be changed. For example, this may involve photograph matting, cropping of photographs or exit setup functions as detailed below.

Select button 17, operates only when the setup sequence is in progress and allows operator to move to detail configuration specifications displayed for selected options. For example for photograph matting—No matting, black, 50% black, and similar or related variations.

Means for cycling, and cycling step of the process invention further include next button 19, which allows an operator to run the manual means to display desired images, and to hear the associated audio sequences in accordance with the next highest frame number. This portion of the teaching of the present invention also is useful in conjunction with the sound recording features of the present invention which are further developed below. When a digital still photograph is in Frame 1 and associated audio displayed, then to trigger the highest frame number when the next button 19, comes into play, and is depressed to effectuate this step.

Likewise, previous button 21, allows the user to operate the manual means to display the photograph and to hear an associated audio sequence with the next lowest frame number and photograph with the next lowest frame number.

Setup features of the present invention allow an operator to program a desired sequence of display, or to have same done manually. To these ends, setup button 13, option button 15, select button 17, next button 19 and previous button 21 are not operational during power up sequence, becoming operational when power up sequence is complete. Likewise, setup button 13, option button 15, select button 17, next button 19 and previous button 21 are operational during the power down sequence and not operational after the power down sequence.

Power light 23, displays a green hue when power is applied to the present invention, and displays a yellow hue when power is inadequate to maintain the performance of this device. A red hue is displayed when power is being disengaged, and when no power is being applied to the device of the present invention. Light Emitting Diode (LED) 25, shows the number of the current frames being displayed, and displays error condition messages in the event that same should occur, in addition to "REC" or the like strings as needed.

Figure 2:
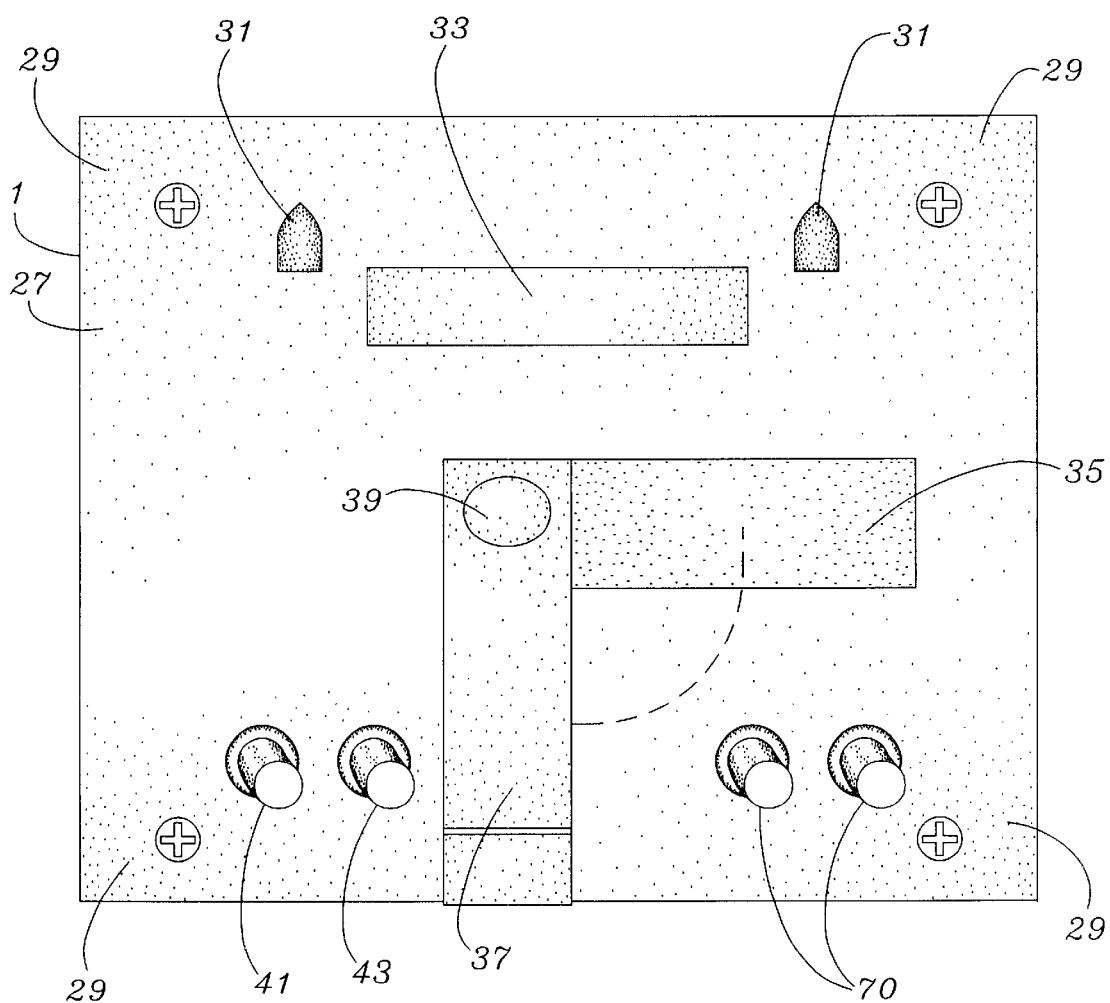
FIG. 2 likewise illustrates a back view of a display screen of an apparatus according to an embodiment of the present invention shown in landscape orientation.
Figure 3:
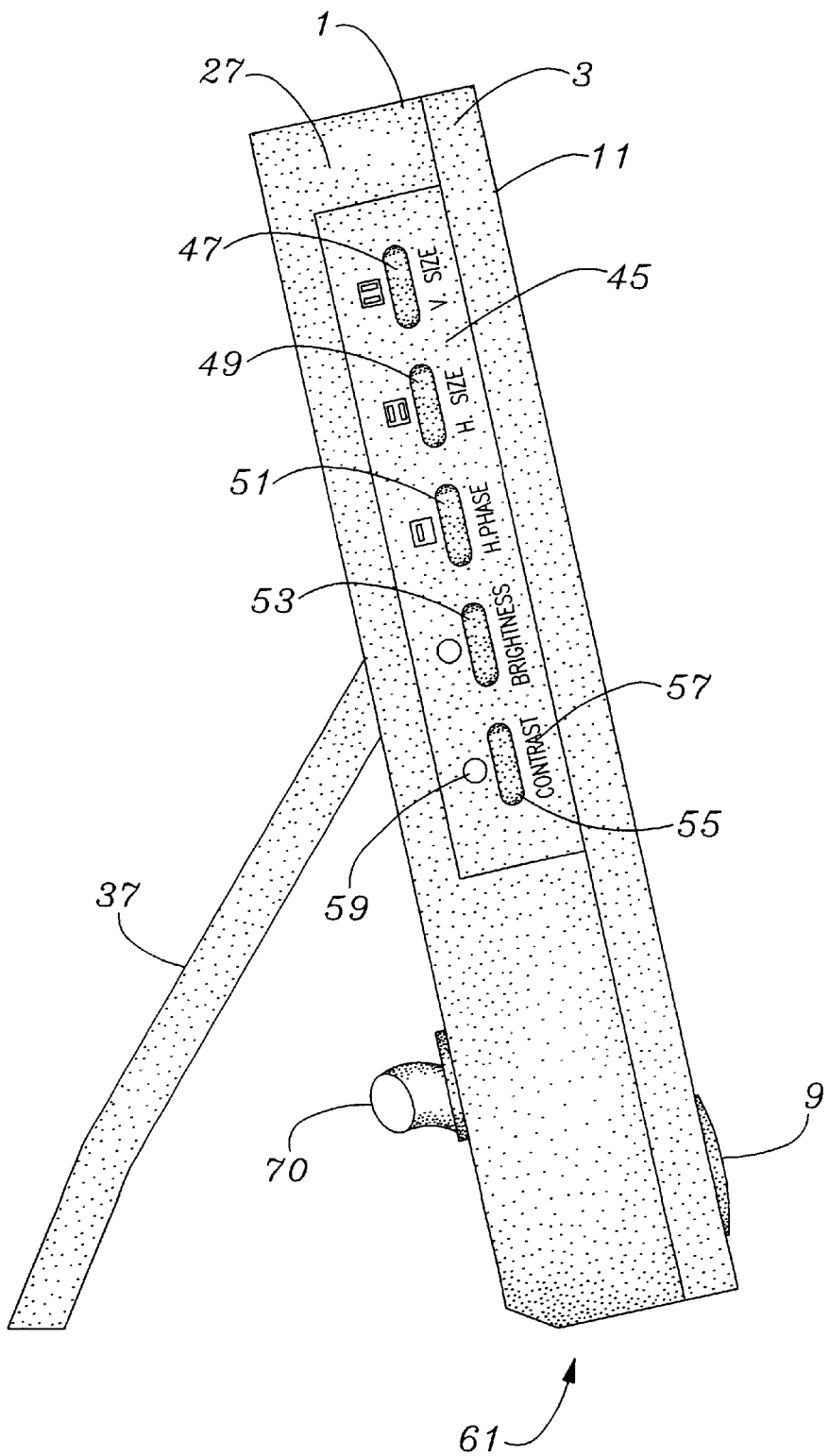
FIG. 3 is a diagram illustrating a landscaped left side view of a display screen of an apparatus according to an embodiment of the present invention, wherein said apparatus is disposed upon a flat surface.

Referring now to FIG. 2 and to FIG. 3, both a left side and a landscaped back-view of Plastic Molded container 3, shows a plurality of indicators, operator control mechanisms and connectors which are mounted on the outside of the container. The backside of the plastic molded container 27 houses the electronic components which are stored internally.

Fastening device 29, is used to hold the front of the plastic molded container 3 to the back of the plastic molded container 27. Fastening device 29 is affixed by means of plurality of apertures which are effective for joining plastic molded container front 3 and plastic molded container back 27 with the use of countersinking in the apertures allowing for positioning of a series of fastener heads flush with the back of plastic molded container 27.

The Wall hanging orifice 31, is composed of at least two slotted apertures permitting placement of the apparatus of the present invention on the surface of a wall (each said orifice is manually engaged with a light piece fixed to a wall (not shown). Nameplate 33, provides a location for the manufacturer to display the pending and issued patent number, trademark or licensing information, any required electrical specifications, hazard notices and light symbols including any and all information which the manufacturer is required by law to display or is of interest to the manufacturer to display on the back side of said device invented to back molded container 27.

Recessed storage area for invention stand 35, is effective to receive invention stand support 37. Recessed storage area invention stand 35 likewise houses invention stand support 37 and is further effective for housing same in the event that the invention is fixed to a wall. Recessed storage area for invention stand 35 is also countersunk to permit the present device to house invention stand support 37 in a manner which allows plastic molded container back 27 to be affixed such that it is flush with a wall.

Invention stand support 37 when extended, allows the apparatus of the present invention to lean backwards at an angle to the vertical which makes viewing of display screen 7 adjustable to the specific need and applications of a specific user's use of, or other employment of the apparatus according to the teachings of the present invention. Invention stand support 37 is capable of making a 90 degree rotation.

Invention stand gimbal 39, provides a connection between invention stand support 37 and the plastic molded container back 27. This invention stand gimbal 39 allows invention stand support 37 to achieve its 90 degree rotation.

Figure 6:
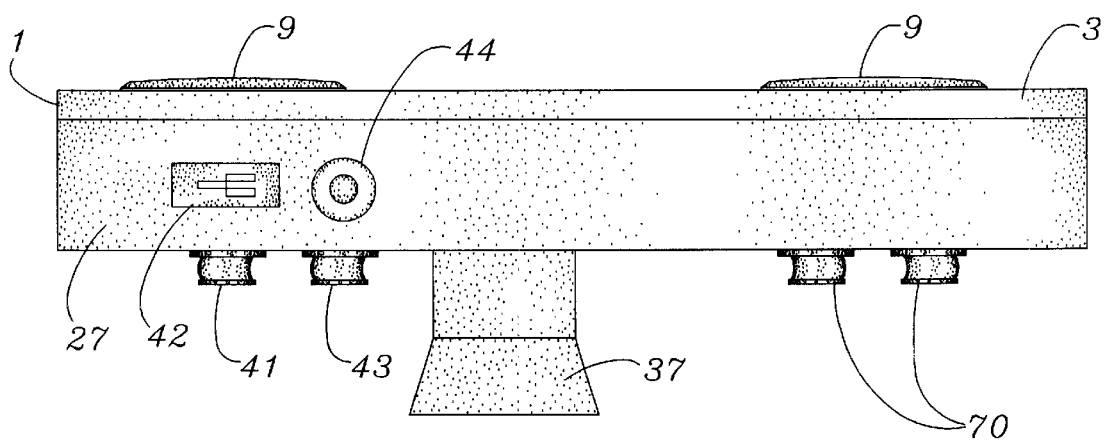
FIG. 6 is a diagram illustrating a landscaped left bottom view of a display screen of the apparatus according to an embodiment of the present invention, wherein the apparatus is disposed upon a flat surface.

Referring now also to FIG. 6, removable power cord 41, is used to connect the plastic molded container back 27 to a 110 VAC outlet, which outlet provides the power source for the apparatus of the present invention. This operation is done in conjunction with recessed power outlet 42 which connects to 110 VAC outlet, providing power to the apparatus of the present invention, and said recessed power outlet 42, is contained in a recessed area in the bottom of the apparatus according to the present invention to allow plastic molded container 27 to be attached flush to a wall with recessed power cord 42 being placed inside of said recessed area.

Alternately, network connection cable 43, connects the apparatus of the present invention to a local area network order to provide means for bringing photographs stored on such a local area network into the operational sequence of the present invention. To these ends, those of skill in the art would readily be able to interface the device of the present invention with any number of known hardware and software systems. Accordingly, further discussion regarding this connection has been omitted.

Similarly, recessed network cable connection 44, permits connection to any local area network and provides means for bringing photographs which may be stored on a local area network into the sequence of operations of the present invention on said recessed cable network connection 44 is similarly contained in the recessed area in the bottom of the apparatus of the present invention for permitting the invention to be affixed to a wall with a substantially planer surface being created by plastic molded container back 27.

Auxiliary stereo input connectors 70, provide for an alternate entrance and egress for audio recording signals which may be used to record audio to accompany a digital photograph from alternate sources such as a phonograph or a compact disc player.

Figure 4:
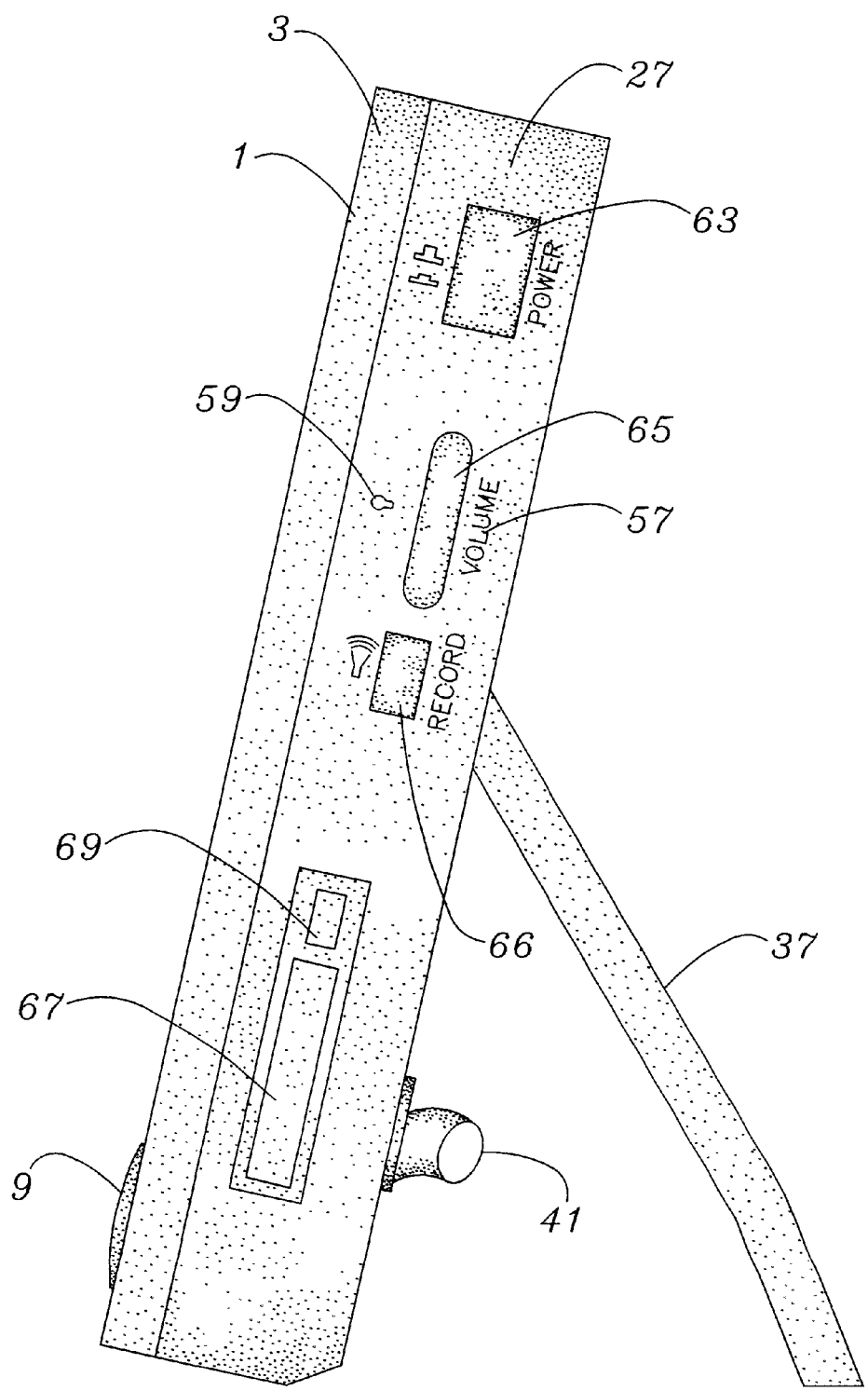
FIG. 4 is a diagram illustrating a landscaped right side view of a display screen of an apparatus according to an embodiment of the present invention, wherein said apparatus is disposed upon a flat

Referring now also to FIG. 3 and FIG. 4, Recessed area for operator controls 45, permits the operator control wheels to be flush with the left side of plastic molded container 3. Vertical size control wheel 47, provides an operator with control of a vertical dimension for a display screen 7, this vertical size control wheel is a wheel controlled rheostat, as would be well understood by those of skill in the art.

Horizontal size control wheel 49, provides operator control of the horizontal size and dimension of the display screen 7, and is likewise a wheel controlled rheostat. Brightness control wheel 53, provides operator control of the brightness of the display screen 7, and is also a wheel controlled rheostat.

Contrast control wheel 55, provides operator control of the color contrast of the display screen 7, and is a wheel controlled rheostat. Function identifier 57, provides a written description in any desired native language of the function of the control wheel 47, for any of the other controlling mechanisms of the present invention including setup button 13, and any other indicators, operator controlled mechanisms, or other connectors which require legends.

Function icon 59, provides for a graphic description in a universal standard of function of the control wheel 47, setup button 13, or any of the other externally mounted mechanisms for operator control as detailed above.

Beveled edge 61, allows the invention embodied in the displayed apparatus according to the present invention to be placed at an angle to vertical when same is supported by invention stand support 37 and to rest squarely and firmly upon a flat surface.

Referring now specifically to FIG. 4, once again, in the pictured embodiment of the apparatus according to the present invention 1, including plastic molded container front 3 and plastic molded container back 27, is shown when same is disposed upon a flat surface. In this view, the power on/off button 63, permits a user to turn power on and off with the power source (not shown) capable of being connected to the present invention used to supply the power for same.

Referring now still to FIG. 4, volume control wheel 65, provides operator control of the volume of the stereo from speakers 9, and is a wheel controlled rheostat. Record button 66, allows audio recording to be made which can be used to accompany digital photographs displayed as they are being displayed on display screen 7. When Record button 66 is active the word "REC" (or any required foreign language simulacrum) appears in the LED frame counter 7. Thus record button 66, allows and operator to add audio through audio input 70 or through the present inventions capabilities using the setup and microphone function, as detailed above and below]

Flash memory slot 67, provides for an entry and egress port for a removable flash memory card (not shown but discussed by way of example and disclosed above), or like non-volatile digital recording medium, same being inserted into the apparatus of the present invention to allow the apparatus of the present invention to access those digital photograph images and accompanying audio recordings which are arrayed inside of flash memory card (not shown).

Those skilled in the art understand that the universal digital still photographic "film" embodied on removable flash memory cards has evolved to the point where several commonly accepted sizes and related parameters enable those making cameras to provide slots effective for receiving them. The present invention likewise contemplates an plurality of interchangeable apertures which are effective for receiving the various small format card standards. Both flash memory cards employing a 22-contact interface (such as the SSFDC discussed at length above) and those with a 60-contact interface (such as the Intel-style mini card) are contemplated to be within the scope of the present invention.

The thin and flexible nature of conventional removable flash memory cards has encompassed both 0.75 mm and 1.4 mm thick versions of these known technologies. Both sizes and styles are readily compatible with the present invention, as disclosed herein and defined by the claims.

Returning to FIG. 4 through FIG. 6, flash memory card release lever 69, is projected when flash memory slot 67 is occupied. When flash memory slot 67 is unoccupied, flash memory card release lever 69 is recessed. Pushing the extended flash memory card release lever 69 released the flash memory card (not shown) extended from the flash memory slot 67 allowing it to be readily removed and inserted into and out of the apparatus according to the present invention.

Figure 5:
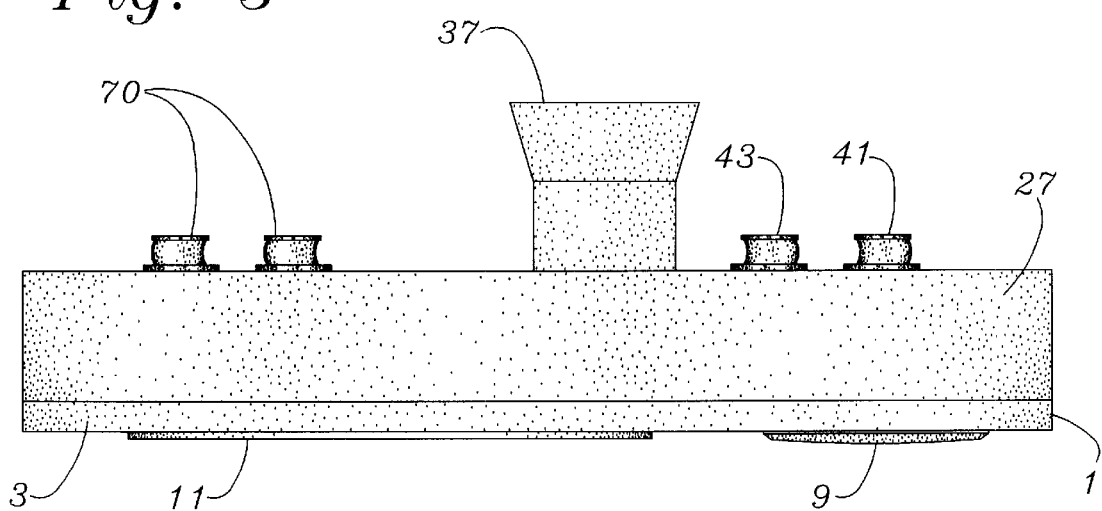
FIG. 5 is a diagram illustrating a top view of an apparatus according to an embodiment of the present invention, wherein said apparatus is disposed upon a flat surface.

Referring now specifically to FIG. 5, Auxiliary stereo input connectors 70, are shown in this view, which auxiliary stereo input connectors 70 provide audio recording to accompany digital photographs from the alternate source including photographic players, compact disc players and the like means for providing alternate audio signals and sequences.

Referring now also to FIG. 6, and FIG. 7, 110 VAC power supply 101, provides power to the apparatus of the present invention, and send signals to indicators which are housed within plastic molded container the front 3 and plastic molded container back 27. As discussed above, removable power cord 41, is used to connect the plastic molded container back 27 to a 110 VAC outlet, which outlet provides the power source for the apparatus of the present invention. This operation is done in conjunction with recessed power outlet 42 which connects to 110 VAC outlet, providing power to the apparatus of the present invention, and recessed power outlet 42, is contained in a recessed area in the bottom of the apparatus according to the present invention to allow plastic molded container 27 to be attached flush to a wall with recessed power cord 42 being placed inside of said recessed area Once again, while terms of the computer arts will be readily known to those having a modicum of skill in the art, to the extend possible the present inventor has spelled out those commonly used acronyms which are required to understand the workings of the present invention. To the extent that such terms have become conventional, detailed explanations are assumed, or adopted by express reference from those publications which are disclosed within the background section of the instant application.

Returning back to FIG. 7, Computer bus 103, carries signals and information among and between Central Processing Unit ("CPU") 109, Random Access Memory ("RAM") 107, Read Only Memory (ROM") 105, video chip 111, flash memory controller 113, network controller 119 and the power supply (not specifically claimed but none the less shown, as schematized).

Computer Bus 103, carries interrupt signals from the power supply to basic input/output system ("BIOS") 117, video chip 111 to CPU 109, or BIOS 117 to video chip 111, sound chip 115, and flash memory controller 113. ROM 105, holds pre-loaded operating software and pre-loaded network software. ROM 105 is volatile memory and holds status information concerning the apparatus of the present information comprising the current photograph and audio recording in process. RAM 107 is tested by BIOS 117 during the power on sequence. If there is an error, an appropriate message is displayed in LED 25. The RAM 107 is initialized by operating software after the power sequence is configured.

CPU 109, processes. instructions which alter the behavior of the apparatus according to the present invention. These instructions for CPU 109 are retrieved from the operating software and network software which both reside in ROM 105. Further, CPU 109 clears ROM 107, loads operating software ("OS"), loads network software ("NWT"), initializes RAM 107 and positions the apparatus of the present invention to frame 1 of the flash memory card. CPU 109 likewise runs the employed embodiment per pre-set parameters, moves frame 1 photo to video chip 111 buffer, moves frame 1 audio to sound chip 115 buffer and connects to local area network as needed.

CPU 109 also detects power down signal, clears LED 25 frame counter, notifies flash memory controller 113 of shutdown and clears RAM 107. CPU also sends signal to power supply 101 to complete power down.

Video chip 111 manages the state of display screen 7, receive signals from the operator controls 47, 49, 51, 53, 55 and passes signals which it handles to the CPU 109. Further, the video chip 111, responds to directions from instructions given to it by CPU 109.

Video chip 111 checks status of display, and should errors exist, same are displayed by way of an error number in LED 25 frame counter. After power on sequence is complete, video chip 111, contains images for Electronic frame 1. Likewise, video chip 111 clears its buffers on the basis of CPU 109's signals.

Flash memory controller 113, manages the state of flash memory installed in the flash memory slot 67, and responds to directions from the instructions directed to it by CPU 109. Flash memory controller 113, is initialized by the power on sequence. It determines if a flash memory card is resident, and send signals to CPU 109. Likewise, flash memory controller 113 permits writing to the flash memory chip, inhibits writing to the flash memory chip, and evicts same from the flash memory slot.

Sound chip 115,manages the state of the stereophonic speakers 9, the microphone 10 and the auxiliary recording input 70 in the event that same are necessary to receive alternate signals for audio processing. Sound chip 115, likewise receives signals from the operator controls and passes signals which supersede that setup by the operator's prior instructions to CPU 109. Sound chip 115, further responds to directions from the instructions directed to it by CPU 109, and checks status of the microphone, speakers and auxiliary inputs. Sound chip 115, displays error messages in LED 25 if are present and sends interrupt to CPU 109. After the power on sequence is complete, sound chip 115 contains the audio recording from frame 1.

BIOS 117 is another read only memory ROM) with a specific function of handling the status of the RAM 107, ROM 105, and CPU 109. The BIOS 117, reports any unrecoverable information to the CPU for repair, as possible. Further, BIOS 117 performs the power up instructions, checks RAM 107, ROM 105 and CPU 109. Appropriate error messages are placed in LED 25 by BIOS 117, and it determines if a flash memory chip is present, in addition to sending interrupt signals to video chip 111, and sound chip 115.

Network controller 119, provides connectivity to the local area network, receives signals from a network and handles appropriate signals, and other signals are sent to CPU 109 for handling. Network controller 119, responds to direction from the instructions directed to it by CPU 109. Network controller 119 performs the power up sequence per instructions. Network controller 119 makes connections with local area networks, as needed—and notifies the CPU of status. In turn, timer 121, provides the ability to schedule process interrupts. Timer 121, is set to interrupt CPU 109, in a number of milliseconds, for which it has been set.

Likewise, it is apparent from the instant teachings, that the automatic cycling of digital still photographs according to the apparatus and process shown operates without the need for network interface, and that in the embodiment using same, network functions and features are imported into the present invention as needed.

Those having a modicum of skill in the art, readily understand the operating software, 123 which includes a set of computer instructions stored on ROM 105, which when executed by the CPU 109, modify the behavior of the instructions being executed and the behavior of the apparatus of the present invention. Similarly, those still in the art will understand how network software 125, another set of computer instructions stored on ROM 105, when executed by the CPU 109, modifies the behavior of the instruction stream being executed and likewise create the interactions with any attached local area network (not shown) in order to appropriately modify the behavior of the apparatus of the present invention.

Setup parameters 127, are a list of options which the operator may use or modify to cause the apparatus of the present invention to alter its behavior including, but not limited to the manner which photographs are displayed in the associated audio recordings are played, for example, photograph sizing and shading techniques, time cycle for automatic rotation of displayed photographs, or the base levels of the speakers 9. The options are maintained in ROM 105 according to the present invention.

Likewise, it is understood that the setup parameters 27, of the present invention work in conjunction with a plurality of potential file formats, as known among conventional digital flash memory devices. The present invention may be used in conjunction with additional software, or additional or external ROM assistance to display file formats which have not been offered for consideration prior to the present invention. For example, the present invention may include means for reformatting images on the basis of such alternate file formats within departing from the scope of the instant teachings or the breadth of the claims appended hereto.

Setup Menu 129, sets all of the setup parameters 127 (not shown . Said setup parameters 127 are displayed for operator viewing and modification, on the display screen 7. The setup menu is caused to be displayed by pressing the setup button 13. Likewise, the operator may select and change any option at anytime, and it is further contemplated that one skilled in the art will realize that overriding of a set of instructions from a flash memory chip will occur when exercising the networking capability of the present invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims. Likewise, the instant teachings constitute and are defined as, both a machine for manipulating data objects by a programmable sequence of interactions, and a computer-implemented process not limited to an element of computer-readable memory or as implemented on a computer constituting a statutorily prescribed subject matter.

What is claimed:

1. An electronic apparatus for the display of digital photographs and the presentation of accompanying audio recordings stored on a non-volatile storage medium, such apparatus comprising:

a housing unit for receiving a non-volatile storage medium and having a display screen for displaying images stored on the non-volatile storage medium;

a support stand for the housing unit;

a recessed storage area formed on the back cabinet member of the housing unit for housing the support stand when not deployed; and a support stand gimbal connected between the support stand and the housing unit for allowing the housing unit to achieve a 90-degree rotation to provide landscape and portrait orientations for the display screen.

2. An electronic apparatus for the display of digital photographs and the presentation of accompanying audio recordings stored on a data network, such apparatus comprising:

a housing unit having a display screen for displaying images received from a data network;

electronic circuitry located in the housing unit and connected to the display screen for receiving digital photograph data from the data network and supplying same to the display screen;

a support stand for the housing unit;

a recessed storage area formed on the back cabinet member of the housing unit for housing the support stand when not deployed; and a support stand gimbal connected between the support stand and the housing unit for allowing the housing unit to achieve a 90-degree rotation to provide landscape and portrait orientations for the display screen.

3. An electronic apparatus for the display of digital photographs and the presentation of accompanying audio recordings in household or office settings, the digital photographs and audio recordings being stored on one of a non-volatile memory and a data network, such apparatus comprising:

a housing unit having front and back cabinet members forming a cabinet for housing electronic components, the front cabinet member including a display screen for displaying images;

electronic circuitry located in the housing unit for receiving a non-volatile memory and supplying digital image data therefrom to the display screen;

additional electronic circuitry located in the housing unit and connected to the display screen for receiving digital photograph data from a data network and supplying same to the display screen;

a fastening device for fastening the back cabinet member to the front cabinet member;

a wall hanging aperture located in the back cabinet member for enabling the housing unit to be wall mounted;

a nameplate affixed to the exterior of the housing unit for providing information concerning the housing unit;

a support stand for the housing unit;

a recessed storage area formed on the back cabinet member for housing the support stand when not deployed; and a support stand gimbal connected between the support stand and the housing unit to achieve a 90-degree rotation to provide landscape and portrait orientations for the display screen.

* * * * *